United States Patent
Jamison et al.

(10) Patent No.: US 11,713,652 B1
(45) Date of Patent: Aug. 1, 2023

(54) MOBILE ROBOTS FOR MANAGING DRILLING OPERATIONS

(71) Applicant: Halliburton Energy Services, Inc., Houston, TX (US)

(72) Inventors: Dale E. Jamison, Humble, TX (US); Daniel Joshua Stark, Houston, TX (US); Andrew Vos, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/986,585

(22) Filed: Nov. 14, 2022

(51) Int. Cl.
| | |
|---|---|
| *E21B 41/00* | (2006.01) |
| *E21B 21/08* | (2006.01) |
| *E21B 21/06* | (2006.01) |
| *G05D 1/02* | (2020.01) |

(52) U.S. Cl.
CPC ............ *E21B 41/00* (2013.01); *E21B 21/062* (2013.01); *E21B 21/08* (2013.01); *G05D 1/0212* (2013.01); *G05D 1/0274* (2013.01); *G05D 1/0291* (2013.01); *E21B 2200/22* (2020.05); *G05D 2201/0202* (2013.01)

(58) Field of Classification Search
CPC ........ E21B 41/00; E21B 21/062; E21B 21/08; E21B 2200/22; G05D 1/0212; G05D 1/0274; G05D 1/0291; G05D 2201/0202
See application file for complete search history.

(56) References Cited

U.S. PATENT DOCUMENTS

| | | | | |
|---|---|---|---|---|
| 9,518,434 | B1* | 12/2016 | Champness | ............. E21B 21/01 |
| 11,365,592 | B1* | 6/2022 | Moon | ...................... E21B 19/06 |
| 2007/0023183 | A1* | 2/2007 | Lesko | ................... E21B 19/165 |
| | | | | 166/77.51 |
| 2021/0054701 | A1* | 2/2021 | Holck | ................... E21B 19/087 |
| 2021/0164303 | A1 | 6/2021 | Valen et al. | |
| 2021/0301606 | A1* | 9/2021 | Mikalsen | ................ E21B 21/01 |
| 2021/0324723 | A1* | 10/2021 | Madasu | .................. E21B 21/06 |
| 2023/0003103 | A1* | 1/2023 | Mydland | ................ E21B 44/10 |

FOREIGN PATENT DOCUMENTS

EP    3784870 A1    3/2021

OTHER PUBLICATIONS

Bradstock, "The Rise of Robots in the Oil and Gas Industry", oilprice.com; Retrieved from internet on Nov. 14, 2022; https://oilprice.com/Energy/Energy-General/The-Rise-Of-Robots-In-The-Oil-And-Gas-Industry.html, Mar. 22, 2022, 6 pages.

(Continued)

*Primary Examiner* — Brad Harcourt
(74) *Attorney, Agent, or Firm* — Kilpatrick Townsend & Stockton LLP (57) ABSTRACT

A mobile robot is disclosed herein. The mobile robot may include a frame, a propulsion module, a navigation module designed to navigate the mobile robot along a target pathway, and a computational module. The mobile robot may obtain a composition reading of the drilling fluid and a pressure reading of the drilling fluid. The robot may determine, using the computational module, an additive to add to a drilling fluid reservoir based on the composition reading and the pressure reading. The mobile robot may then retrieve the additive from an inventory and deposit the additive into the drilling fluid reservoir.

20 Claims, 4 Drawing Sheets

(56) References Cited

OTHER PUBLICATIONS

CBC News, "Unleashing the future: Shell adds a team of robodogs to its Scotford operations", CBC.CA; retrieved from internet on Nov. 14, 2022; https://www.cbc.ca/news/canada/edmonton/shell-scotford-robodogs-1.5934940, Mar. 3, 2021, 6 pages.

Ferrer, "The Blockchain: A New Framework for Robotic Swarm Systems", link.springer.com; Retrieved from internet on Nov. 14, 2022; https://doi.org/10.1007/978-3-030-02683-7_77, Oct. 20, 2018, 17 pages.

Jee, "Boston Dynamics' dog robot Spot is going to patrol an oil rig in Norway", technologyreview.com; Retrieved from internet on Nov. 14, 2022, https://www.technologyreview.com/2020/02/13/844815/boston-dynamics-spot-dog-robot-is-going-to-patrol-an-oil-rig-in-norway/, Feb. 13, 2020, 7 pages.

Petrova, "Where four-legged robot dogs are finding work in a tight labor market", CNBC.com, retrieved from internet on Nov. 14, 2022; https://www.cnbc.com/2021/12/26/robotic-dogs-taking-on-jobs-in-security-inspection-and-aublic-safety-.html, Dec. 26, 2021.

Reuters, "Boston Dynamics dog robot 'Spot' learns new tricks on BP oil rig", Reuters.com; Retrieved from internet on Nov. 14, 2022; https://www.reuters.com/article/us-bp-boston-dynamics-robot-oil-rig-chan-idUSKBN28E2D0, Dec. 4, 2020, 3 pages.

Reuters, "Boston Dynamics dog robot 'Spot' learns new tricks on BP oil rig", Reuters.com; Retrieved from internet an Nov. 14, 2022; https://www.reuters.com/article/us-bp-boston-dynamics-robot-oil-rig-chan-idUSKBN28E2D0, Dec. 4, 2020, 3 pages.

* cited by examiner

MOBILE ROBOTS FOR MANAGING DRILLING OPERATIONS

TECHNICAL FIELD

The present disclosure relates generally to wellbore drilling operations and, more particularly (although not necessarily exclusively), to managing various drilling operations using mobile robots.

BACKGROUND

During the course of a typical wellbore drilling operation, a drill bit may create a hole with a marginally larger diameter than the diameter of a drill string, thereby creating an annular space between the drill string and the wellbore wall. During most drilling operations, this annular space may need to be pressurized to maintain the structural integrity of a wellbore.

Also, during a typical well drilling operation, small pieces of rock may break away due to the action of the drill bit drilling through a geological formation. These rock cuttings may need to be carried away from the drill bit to a well surface for the drill bit and the drill string to advance through geological formation. By pumping a drilling fluid downhole through the drill string, the drilling fluid can flush cuttings away from the drill bit as the fluid travels back to the surface through the annular space. Filling the annular space with this drilling fluid can also pressurize the wellbore to maintain the wellbore's structural integrity.

As a drilling operation progresses, the properties of the drilling fluid may need to be adjusted. For example, the viscosity of the drilling fluid may need to be altered, by introducing an additive into the drilling fluid at the surface, in response to a change in pressure within the wellbore. Adjustments to properties of the drilling fluid may need to be performed dynamically, as events like a stuck pipe or a loss of drilling fluid circulation can occur unexpectedly.

DETAILED DESCRIPTION

Certain aspects and examples of the present disclosure relate to managing one or more aspects of a drilling operation using a mobile robot. A mobile robot can be an autonomous machine capable of locomotion. Mobile robots may be able to move around an environment, as opposed to being fixed to one location. In some instances, mobile robots may be able to autonomously navigate an uncontrolled environment without the need for guidance from a human operator. The mobile robot may be able to manage one or more aspects of a drilling operation, such as the content of a drilling fluid. For example, the mobile robot can adjust the composition of a drilling fluid by introducing additives into the drilling fluid at a surface. The mobile robot may be programmed to select additives based on instrument readings gathered by the mobile robot, environmental observations made by the mobile robot, instructions given to the mobile robot by a computing device or a human operator, a drill plan, and/or other factors. As another example, the mobile robot can adjust the composition of a cement slurry for a wellbore completion operation by controlling amounts of cement, water, or additives which may be pumped into the wellbore.

Managing aspects of a drilling operation using mobile robots may offer several advantages. Mobile robots may be able to function and make decisions with a higher degree of accuracy than a human. A mobile robot may also be able to coordinate tasks with another mobile robot with clearer, faster communication and with superior consideration for optimal efficiency. For example, a first mobile robot can easily deduce which other robots on a drilling rig it can call for help based on every robot's proximity to a desired drilling fluid additive, every robot's physical capacity, every robot's present task load, etc. Also, a drilling rig can be a hazardous environment. Reducing the number of humans on a drilling rig can reduce the chance of human injury.

In addition to managing the drilling fluid, a mobile robot may be able to predict a rate at which particular drilling fluid additives may be consumed based on collected drilling data. For example, based on data collected during a drilling operation, the mobile robot may be able to predict how much polymer-based temperature stabilizer will be consumed as the drilling operation continues. The mobile robot may then compare the predicted stabilizer consumption to how much stabilizer is in an inventory at the wellsite and, if necessary, may order more stabilizer to the wellsite inventory. In some examples, the mobile robot can measure many parameters related to the drilling fluid, such as temperature, pressure, viscosity, an oil-to-water ratio, density, additive formulation, lost circulation material content, thermal capacity, thermal conductivity, or salinity. The mobile robot may then execute one or more tasks based on the measured parameters, for example to improve the overall drilling process.

Apart from managing the drilling fluid, the mobile robot may be able to perform other operations at the wellsite like detecting or even predicting hazards, sharing alerts related to the hazards, and responding to the hazards. The mobile robot may also be able to perform maintenance tasks, such as visually inspecting shaker screens, inspecting pump or centrifuge gauges, detecting equipment malfunctions, or providing information to a computing device executing hydraulic simulation software such as Halliburton's® BaraLogix® software.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
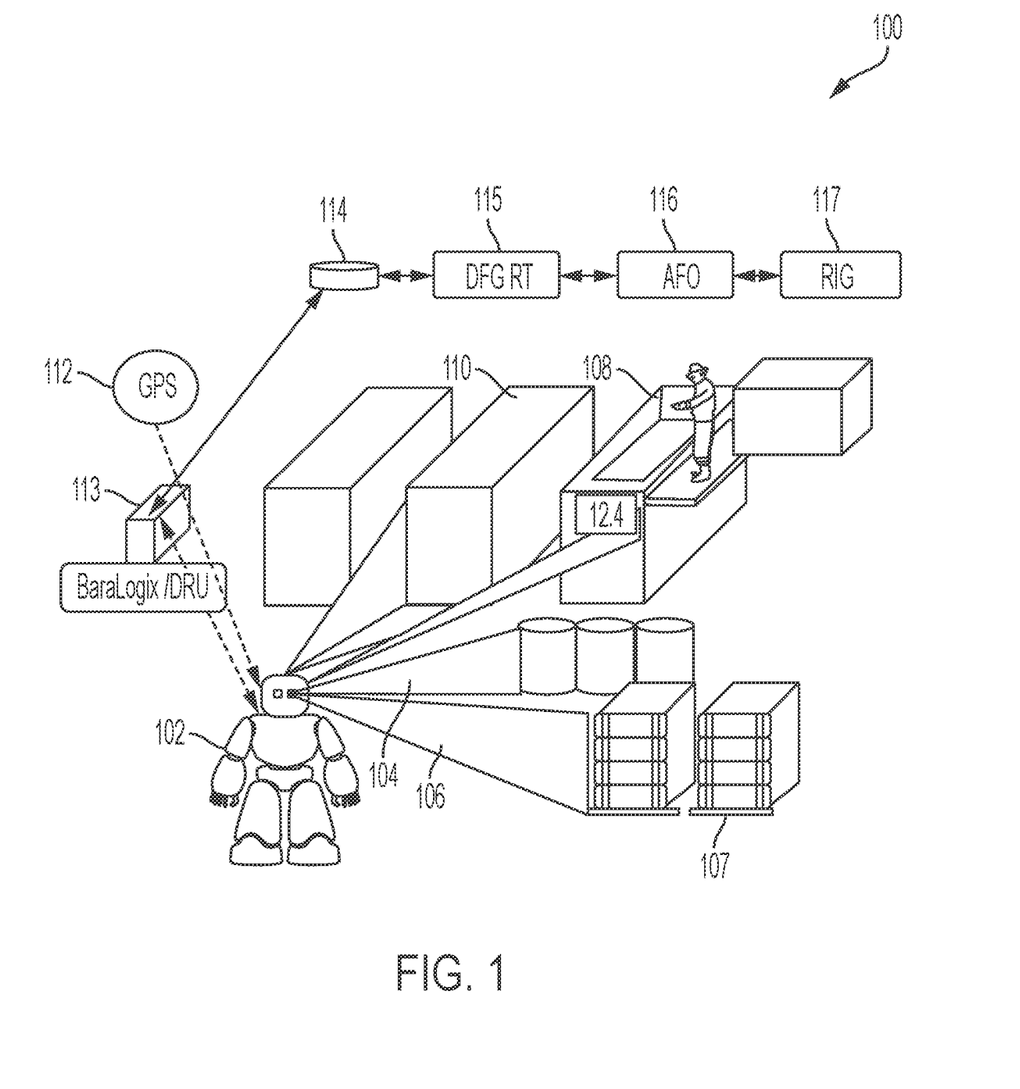
FIG. 1 is a block diagram of an example of a system for managing a drilling fluid with a mobile robot according to some aspects of the present disclosure.

FIG. 1 is a block diagram of an example of a system 100 for managing a drilling fluid with a mobile robot 102 according to some aspects of the present disclosure. In general, the system 100 can include a wellsite at which a drilling operation or other wellbore operations may be performed. At the wellsite, there may be various piece of physical equipment for use in performing the wellbore operations. Examples of the physical equipment can include containers, fluid reservoirs, tanks, pumps, pipes, drill bits, drill strings, rotors, etc. One or more mobile robots, such as mobile robot 102, can be positioned at the wellsite to assist in the wellbore operations. For example, the mobile robots may be configured to autonomously interact with each other and the physical equipment to manage a wellbore operation, avoid hazards, mitigate hazards, and perform other tasks. This may involve the mobile robots autonomously navigating around structures at the wellsite, lifting objects, manipulating controls, pouring or mixing chemicals or fluids, and/or performing other tasks.

The mobile robot 102 may use a camera 104, laser, ultrasonic sensor, RADAR, LIDAR, or other instruments to identify physical equipment and structures at the wellsite. The mobile robot 102 may also use wireless electronics 106, such as radio frequency identification (RFID) chips, to identify equipment, structures, and items within an inventory 107. For example, certain pieces of equipment may have RFID tags that can be read by the mobile robot 102 to identify the equipment.

The mobile robot 102 may have orientation instruments to locate itself relative to equipment 110, structures, and other mobile robots. Examples of orientation instruments can include GPS 112, cameras, lasers, acoustic instruments (e.g., ultrasonic range sensors), gyroscopes, accelerometers, and compasses. The mobile robot 102 can use one or more of the orientation instruments to autonomously navigate around the wellsite. In some examples, the mobile robot 102 may determine its location from data transmitted by other mobile robots at the wellsite. The mobile robots can also communicate information to one another, such as their own locations and the locations of obstacles (e.g., structures and equipment). This can help prevent the mobile robots from crashing into each other and obstacles.

The equipment 110 may possess a sensor 108 external to the mobile robot 102. The mobile robot 102 may use the camera 104, wireless electronics 106, or other onboard devices to read the sensor 108. For example, the sensor 108 may collect readings or data from the equipment 110 and output that information on a display. The mobile robot 102 may then read the information on the display, for example using a camera. As one particular example, a pressure sensor may display a drilling fluid pressure within a pipe. The pressure sensor may be integrated into the pipe for taking such measurements, which may be significantly less disruptive than the mobile robot 102 physically cutting into and accessing the interior of the pipe to obtain a pressure reading with its own onboard sensor package. The mobile robot 102 may perform one or more tasks based on the sensor information, such as comparing a sensor reading to a well plan, transmitting the sensor reading to a server 113, or creating an event alert based on the sensor reading. In some examples, the mobile robot 102 may control the equipment 110 based on a reading from the sensor 108. For example, the mobile robot 102 may adjust a valve of the equipment 110 based on a pressure reading from the sensor 108. The mobile robot 102 may introduce a new drilling fluid additive into the equipment 110 as a result of a reading from the sensor 108. For example, the mobile robot 102 may add a weighing agent to a drilling fluid reservoir in response to a pressure reading from a gauge.

The mobile robot 102 may be in communication with the server 113. The server 113 may possess hydraulic simulation software such as Halliburton's® BaraLogix® software. The mobile robot 102 may provide data gathered from the wellsite as well as the mobile robot's 102 own calculations to the simulation software of the server 113. In some examples, the hydraulic simulation software may provide the mobile robot 102 with modeling data that may allow the mobile robot 102 to make better informed adjustments to the equipment 110. In some examples, the server 113 may provide the mobile robot 102 with instructions based on the hydraulic software simulation or based on other instructions native to the server 113. The server 113 may be an automated Baralogix® software density and rheology unit that may be communicatively coupled to a sensor 108 for monitoring viscosity, density, or other drilling fluid properties. The server 113 may be in communication with a data storage system 114 which may be collect data from a real-time drilling fluid graphics (DFG) workstation 115. The DFG workstation 115 may be in communication with an applied fluids optimization (AFO) operator monitoring a wellsite 117, such as the wellsite 200 of FIG. 2. Human operators at the data storage system 114 may be able to provide the mobile robot 102 with instructions, which may be informed by the hydraulic modeling software or data gathered and processed by the mobile robot 102.

Figure 2:
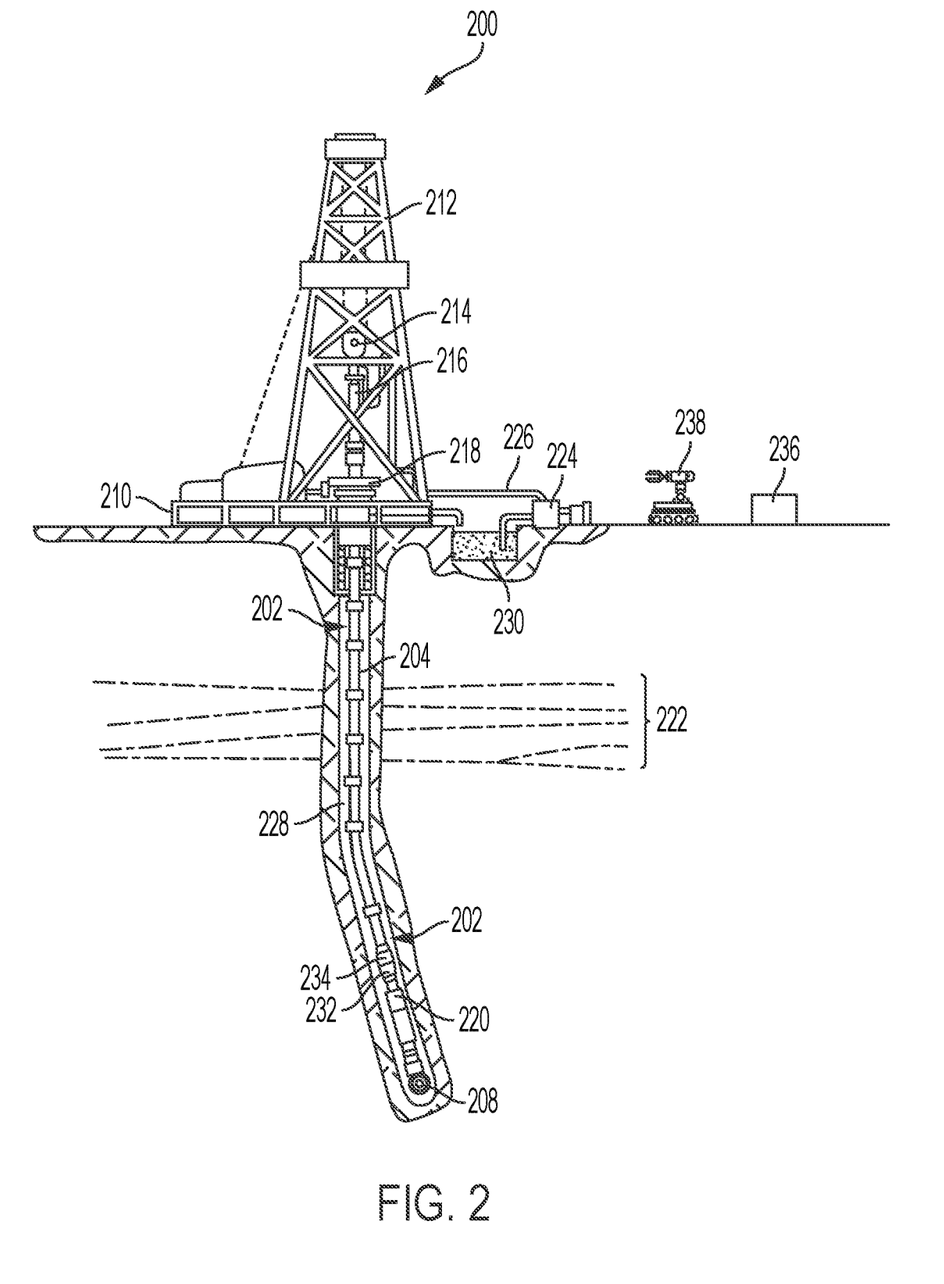
FIG. 2 is a cross-sectional side view of an example of a wellsite that can include a mobile robot according to some aspects of the present disclosure.

FIG. 2 is a cross-sectional view of an example wellsite 200 that can include a mobile robot 238 according to some aspects of the present disclosure. As shown, the wellsite 200 can include drilling system that includes a drilling fluid reservoir 230. The content of the drilling fluid reservoir 230, and other aspects of a drilling operation, may be managed by a mobile robot 238 in some examples. The drilling system at the wellsite 200 can direct a drill bit 208 in drilling a wellbore 204, such as a subsea well or a land well. The wellsite 200 can be used to drill a wellbore 204 for extracting oil, gas, water, etc. from a subterranean formation. In some examples, the drilling system can be used for exploring and forming geothermal wellbores intended to provide a source of heat energy instead of hydrocarbons.

The drilling system can include a drill string 202 disposed in a directional wellbore 204. A drilling platform 210 supports a derrick 212 having a traveling block 214 that may raise and lower the drill string 202. A kelly bushing 216 supports the drill string 202 as the drill string 202 may be lowered through a rotary table 218. Alternatively, a top drive can be used to rotate the drill string 202 in place of the kelly bushing 216 and the rotary table 218. The drill bit 208 is positioned at the downhole end of the drill string 202 and can be driven by rotation of the entire drill string 202 from the surface or by a downhole motor 220 positioned on the drill string. As the drill bit 208 rotates, the bit 208 may form the wellbore 204 that passes through various formations 222. A pump 224 may circulate the drilling fluid through a feed pipe 226 and downhole through the interior of the drill string 202, through orifices in the drill bit 208, back to the surface via the annulus 228 around the drill string 202, and into a drilling fluid reservoir 230. The drilling fluid may transport cuttings from the wellbore 204 into the reservoir 230 and pressure provided by the drilling fluid may aid in maintaining the integrity of the wellbore 204.

The drill string 202 may include one or more logging while drilling (LWD) or measurement-while-drilling (MWD) tools 232 that can collect measurements relating to various wellbore 204 and formation 222 properties as well as the position of the bit 208 and various other drilling conditions as the bit 208 extends the wellbore 204 through the formation 222. The logging data gathered by the tools 232 may be used by the mobile robot 238 at the surface to formulate the drilling fluid or respond to events detected by the tools 232 with actions at the surface. For example, an LWD may detect a flow of formation fluids into the wellbore 204 during drilling operations. The mobile robot 238 may be able to introduce additives into the drilling fluid reservoir 230 to adjust the viscosity of the drilling fluid in response to a predicted change in pressure from the formation fluids. The LWD/MWD tool 232 may include a device for measuring formation resistivity, a gamma ray device for measuring gamma ray intensity, devices for measuring the inclination and azimuth of the drill string 202, pressure sensors for measuring the drilling fluid pressure, temperature sensors for measuring wellbore temperature, etc.

The drill string 202 may also include a telemetry module 234. The telemetry module 234 may receive data provided by various sensors of the drill string 202 (e.g., sensors of the LWD/MWD tool 232), and may transmit the data to a server 236, similar to the server 113 of FIG. 1. Data may also be provided by the server 236, provided by a data storage system similar to the data storage system 114 of FIG. 1, received by the telemetry module 234, and transmitted to the tools (e.g., LWD/MWD tool 232, drill bit 208, etc.) of the drill string 202. For example, the server 236 may instruct the drill bit 208 to stop in response to an event detected by the LWD/MWD tool 232 and sent to the server 236 by the telemetry module 234. Mud pulse telemetry wired drill pipe, acoustic telemetry, or other telemetry technologies known in the art may be used to provide communication between the server 236 and the telemetry module 234. The server 236 may also communicate directly with the LWD/MWD tool 232 or the drill bit 208. The server 236 may be a computer stationed at the wellsite 200 or offsite. In some examples, the server 236 may also serve as a control unit that controls the functions of the equipment of the drill string 202.

A mobile robot 238 can also be positioned at the wellsite 200. The mobile robot 238 can perform various operations to aid in the drilling of the wellbore 204 or other well operations. The mobile robot 238 may decide to perform those operations on its own, for example in response to detecting certain events. Additionally or alternatively, the mobile robot 238 may be prompted to perform various operations by a human operator or based on external notifications, such as notifications from the server 236. For example, the server 236 may detect an event and inform the mobile robot 238 of the event. In response to receiving a notification about the event from the server 236, the mobile robot 238 may adjust the composition of drilling fluid, for example by introducing an additive into the drilling fluid reservoir 230. After adjusting the composition of the drilling fluid, the mobile robot 238 may then transmit a communication associated with the adjustment to the server 236. The server 236 may receive the communication and control (e.g., resume) the drilling operation based on the communication.

Figure 3:
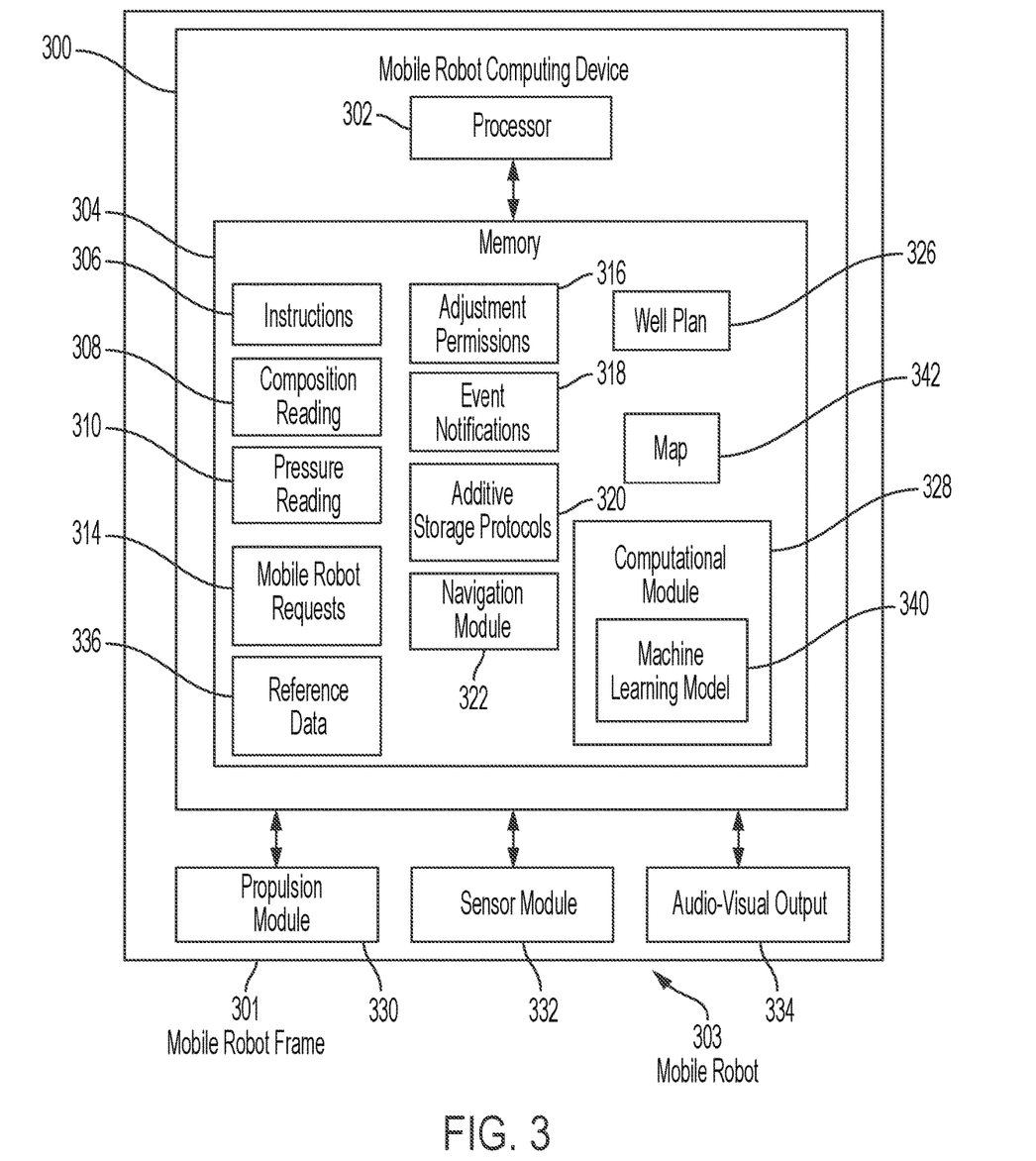
FIG. 3 is a block diagram of an example of a mobile robot with a computing device programmed to manage wellsite operations according to some aspects of the present disclosure.

FIG. 3 is a block diagram of an example of a mobile robot 303 with a computing device programmed to manage wellsite operations according to some aspects of the present disclosure. The mobile robot 303 may have a physical frame 301 constructed from metal, rubber, plastic, and/or any other suitable materials. The frame 301 may support a propulsion module 330. The propulsion module 330 may include an electric motor, a combustion engine, or another propulsion device. The propulsion module 330 may move the mobile robot 303 via wheels, treads, legs propellers, blowers, air-cushions, wings, or any other suitable means of allowing the mobile robot 303 to move within a wellsite environment. The propulsion module 330 may include mechanisms such as levers, flywheels, or claws for climbing stairs or raising the mobile robot 303 from a fallen position.

The frame 301 may also support a sensor module 332. The sensor module 332 may include optical instruments such as cameras, lasers, and telescopic lenses, for gathering visual data. The sensor module 332 may include wireless electronics, such as antennas, transmitters, and receivers, for receiving instructions, sending instructions, or executing automatic identification and data capture in the case of RFID chips, smart cards, biometrics, or magnetic strips. The sensor module 332 may include lasers, acoustic sensors, ultrasonic sensors, gyroscopes, accelerometers, compasses, capacitive proximity sensors, inductive proximity sensors, shock sensors, RADAR, LIDAR, and GPS, for orienting the mobile robot 303. The sensor module 332 may include gas detectors to detect combustible, flammable, and toxic gases as well as oxygen depletion. For example, the sensor module 332 may include a carbon monoxide detector, an oxygen detector, a hydrogen sulfide detector, and a combustibles detector.

The sensor module 332 may also include instruments for measuring properties of fluids (e.g., drilling fluids) and equipment at the wellsite. For example, the sensor module 332 can include instruments for measuring temperature, angle, inclination, pressure, rotation speed, viscosity, water content, hydrocarbon content, density, additive formulation, lost-circulation material content, thermal capacity, thermal conductivity, or salinity.

The sensor module 332 may include force sensors (e.g., pressure sensors, torque sensors, or strain sensors) for measuring forces present on the mobile robot 303. For example, the force sensors may be used to measure the weight of a bag of drilling fluid additive lifted by the mobile robot 303. A control system of the mobile robot 303 may be able to attenuate force from the propulsion module 330 to appropriately handle physical objects, such as sacks of drilling fluid additive that may otherwise be crushed, punctured, etc.

The frame 301 may also support an audio-visual output 334. The audio-visual output 334 may include speakers, screens, projectors, printers, lights, and alarms to communicate with or alert humans at the drilling wellsite.

The frame 301 may also support a mobile robot computing device 300. The mobile robot computing device 300 can include a processor 302 communicatively coupled to a memory 304. The processor 302 can include one processing device or multiple processing devices. Non-limiting examples of the processor 302 include a Field-Programmable Gate Array (FPGA), an application-specific integrated circuit (ASIC), or a microprocessor. The processor 302 can execute instructions 306 stored in the memory 304 to perform computing operations. The instructions 306 may include processor-specific instructions generated by a compiler or an interpreter from code written in any suitable computer-programming language, such as C, C++, C#, Python, or Java.

The memory 304 can include one memory device or multiple memory devices. The memory 304 can be volatile or can be non-volatile, such that it can retain stored information when powered off. Some examples of the memory 304 can include electrically erasable and programmable read-only memory (EEPROM), flash memory, or any other type of non-volatile memory. At least some of the memory 304 includes a non-transitory computer-readable medium from which the processor 302 can read instructions 306. A computer-readable medium can include electronic, optical, magnetic, or other storage devices capable of providing the processor 302 with computer-readable instructions or other program code. Some examples of a computer-readable medium include magnetic disks, memory chips, ROM, random-access memory (RAM), an ASIC, a configured processor, optical storage, or any other medium from which a computer processor can read the instructions 306.

In some examples, the memory 304 can include various software modules to facilitate operation of the mobile robot 303. For example, the memory 304 can include a navigation module 322. The navigation module 322 can operate the propulsion module 330 to navigate the mobile robot 303 along a target pathway from a starting location to a destination location. The navigation module 322 may receive sensor data from the sensor module 332 and apply an algorithm to navigate the mobile robot 303 around obstacles and structures. The navigation module 322 may also process data from other mobile robots to help avoid collisions.

The computational module 328 can include at least one machine learning model 340, such as a neural network, support vector machine, decision tree, or naive classifier. The computational module 328 may predict an amount of drilling fluid additive that may be required based on a well plan 326 and a drilling fluid composition reading 308. The machine learning model 340 may be trained with data from previous wellbore operations as well as data collected during a present wellbore operation. Training data may include a history of additives added to a drilling fluid, changes in physical properties of the drilling fluid during operations, telemetry data, the well plan 326 as well as other well plans. The computational module 328 may use prediction results from the machine learning model 340 to perform operations at a wellsite. Operations may include selecting and dispensing drilling fluid additives, ordering drilling fluid additives to the wellsite, selecting and dispensing wellbore cement, selecting and dispensing wellbore cement additives, and ordering cement and cement additives to the wellsite.

The machine learning model 340 may also be trained to perform maintenance or adjustments on equipment at the wellsite. For example, the machine learning model 340 may be trained with values for valve settings that can affect drilling fluid pressure as well as drilling fluid pressure readings. The machine learning model 340 may optimize a value for a valve adjustment based on previous pressure readings associated with previous valve adjustments, points of progression through a well plan 326, telemetry data, data related to the physical properties of drilling fluid, etc.

The memory 304 may also include reference data 336. The reference data 336 may include physical models, lookup tables, physical models, regression models, models developed from design of experiment principles, heuristic functions, or knowledge graph data models. The reference data 336 may be used by the computational module 328 as diagnostic tools or as prescriptions for selecting operations to perform at the wellsite. The reference data 336 may be updated with information gathered by the mobile robot 303, information gathered from other mobile robots, or external sources such as the database 114 of FIG. 1

The processor 302 can receive sensor data from the sensor module 332, process the sensor data using one or more algorithms and/or the computational module 328, and make decisions based on the processing results. The sensor data and resulting decisions can be related to hazardous events, such as a well kick, a fire at the wellsite, or a chemical hazard detected by chemical sensors within the sensor module 332 of the mobile robot 303. The sensor data and resulting decisions can be related to affecting a downhole environment, such as adjusting a drilling fluid for a drilling operation or adjusting a cement mixture for a completion operation. The sensor data and resulting decisions can be related to navigating the wellsite and considering the traffic of other mobile robots as well as humans.

As one specific example, the processor 302 may receive a composition reading 308 of the drilling fluid from the sensor module 332, receive a pressure reading 310 of the drilling fluid from the sensor module 332, and receive a well depth from the telemetry module 234 of the drill string of FIG. 2. The processor 302 can then compare the composition reading 308, the pressure reading 310, and the well depth to the well plan 326, determine an additive to add to a drilling fluid reservoir from an inventory 107. The processor 302 may then instruct the mobile robot 303 to retrieve the additive from inventory 107 for depositing into the drilling fluid reservoir.

The processor 302 can monitor properties of fluids or equipment using the sensor module 332. The processor 302 can analyze the properties using predefined algorithms or the computational module 328 to detect events and respond to those events. The processor 302 can determine how to respond to those events using the computational module 328, lookup tables with pre-defined workflows, or requests for instruction from an administrator.

As one specific example, the processor 302 may cause the mobile robot 303 to monitor the value of a property of a fluid or piece of equipment, determine that an adjustment is to be made to the fluid or equipment based on the value of the property, request permission 316 to make the adjustment (e.g., from a human), and in response to receiving said permission 316, adjust the value of the property. For example, the mobile robot 303 may execute the navigation module 322 to perform a rig survey involving navigating to various physical locations on the rig and analyzing the properties of equipment at those locations. During the rig survey, the mobile robot 303 may use the sensor module 332 to perform maintenance checks, such as inspecting shale shaker bins for capacity or inspecting various gauges and instruments external to the mobile robot 303. The mobile robot 303 may use a machine learning model 340 of the computational module 328 to predict a well kick based on one or more factors, such as a pressure reading 310 at a gauge, a recent pressure reading 310, a recent composition reading 308, the well plan 326, data from the data storage system 114 of FIG. 1, and data from the server 236 of FIG. 2. In response to predicting the well kick, the mobile robot 303 may request permission 316 to make an adjustment to a valve monitored by the gauge to avoid the predicted well kick. The mobile robot 303 may request the permission 316 by, for example, transmitting a wireless request to a client device of a well operator, who can approve the request via the client device. After receiving the permission 316, the mobile robot 303 may execute the adjustment by actuating the valve. In other examples, the mobile robot 303 may simply perform the adjustment without first requesting permission.

In some examples, the mobile robot 303 can receive event notifications 318 from external sources, such as other mobile robots, servers 114, 236 or human operators. Based on receiving an event notification 318, the mobile robot 303 can perform one or more corresponding operations. For example, the mobile robot 303 may determine that it is to perform a new task in response to receiving the event notification 318. If the mobile robot 303 is already performing a task when it receives the event notification 318, the mobile robot 303 can determine which task should be prioritized over the other. For example, the mobile robot 303 can determine that the new task triggered by the event notification 318 is to be prioritized over the current task. The mobile robot 303 may determine the new task holds a higher priority than the current task in any suitable manner, for example by referencing a lookup table with a pre-defined workflow or by referencing an optimized workflow produced by the computational module 328 from training data related to the new task or the current task. Based on determining the new task is to be prioritized over the current task, the processor 302 may determine a stoppage plan to stop (e.g., pause) performance of the current ask. The stoppage plan may be designed to avoid hazards or other problems that may result from stopping a task midstream. The stoppage plan may be determined based on various factors, such as additive storage protocols 320, wellsite traffic considerations, and data received from one or more other mobile robots. The processor 302 may use a lookup table of predefined stoppage plans, the computational module 328, or other means to determine which stoppage plan to apply based on some or all of the above factors.

After determining a stoppage plan, the processor 302 may respond to the event notification 318 with an acceptance and may execute the stoppage plan to stop its current task. After stopping its current task, the mobile robot 303 can travel to a location associated with the new task. For example, the mobile robot 303 may be carrying potassium hydroxide to adjust the alkalinity of the drilling fluid. The mobile robot 303 may then receive the event notification 318 of a lost circulation event. The mobile robot 303 may then reference the additive storage protocols 320 to determine how to store the potassium hydroxide in a way that is relatively safe. The mobile robot 303 may use its sensor modules 332 to identify a shady location, so the mobile robot 303 can store the potassium hydroxide in a cool, dry place. After putting down the potassium hydroxide in the shaded location, the mobile robot 303 may then retrieve an acid-soluble lost-circulation material to address the event notification 318. Thus, the mobile robot can be intelligent enough to know how to stop its current task in a relatively safe manner. After completing the higher priority task, the mobile robot may automatically resume its prior, stopped task. For example, the mobile robot 303 can navigate back to the shaded location to obtain the potassium hydroxide and continue with its prior task of adjusting the alkalinity of the drilling fluid.

In some examples, the mobile robot 303 can detect events based on one or more readings from the sensor module 332. For instance, the mobile robot 303 can detect an event based on observed equipment violating a predefined operating procedure. In some such examples, multiple mobile robots may confer wirelessly, or consult a delegating server similar to the server 113 of FIG. 1, to determine which mobile robot should address the event. For example, another mobile robot may already be carrying certain materials that can address the event, may already be close to a piece of physical equipment that can be adjusted to address the event, or may have certain functional capabilities to address the event that other mobile robots may not possess. So, that other mobile robot may be selected to address the event based on its content, location, and/or capabilities. The selected mobile robot may then execute one or more operations to address the detected event. In some examples, the mobile robot 303 may use audio-visual output 334 to alert a human audience to the event. For example, the mobile robot 303 may detect an undesirable chemical combination with its sensor module 332. The mobile robot 303 may be able to alert a human audience of the hazard posed by the chemical combination.

In some examples, the mobile robot 303 may conduct a rig survey to create a map 342 of the wellsite, wherein the map 342 may be populated with elements related to the well plan 326. The map 342 can be a three dimensional (3D) map populated with 3D coordinates indicating the locations of equipment, structures, the mobile robot itself 303, other mobile robots on the wellsite, and other features associated with the wellsite. Conducting a rig survey may involve the mobile robot 303 navigating the wellsite and identifying (e.g., using the computational module 328) equipment, materials, and features of the wellsite. Materials may include drilling fluid additives, cleaners, and other substances the mobile robot 303 can either move or request be moved. Features may include ambulatory features such a stairs, pathways, and doorways. Features may also include hazards and obstacles for the mobile robot 303 to consider or avoid. For example, while conducting the rig survey the mobile robot 303 may define blind spots around corners or doorways to consider during subsequent tasks. The mobile robot 303 may be able to share the results of the rig survey or portions of the rig survey with other mobile robots. For example, a plurality of flying drones may conduct a rig survey to identify equipment, materials, and features of the wellsite. The data collected from the flying drone's rig survey may be shared with quadrupedal mobile robots that may not be able to execute the rig survey as efficiently or effectively as the flying drones in this example circumstance.

Figure 4:
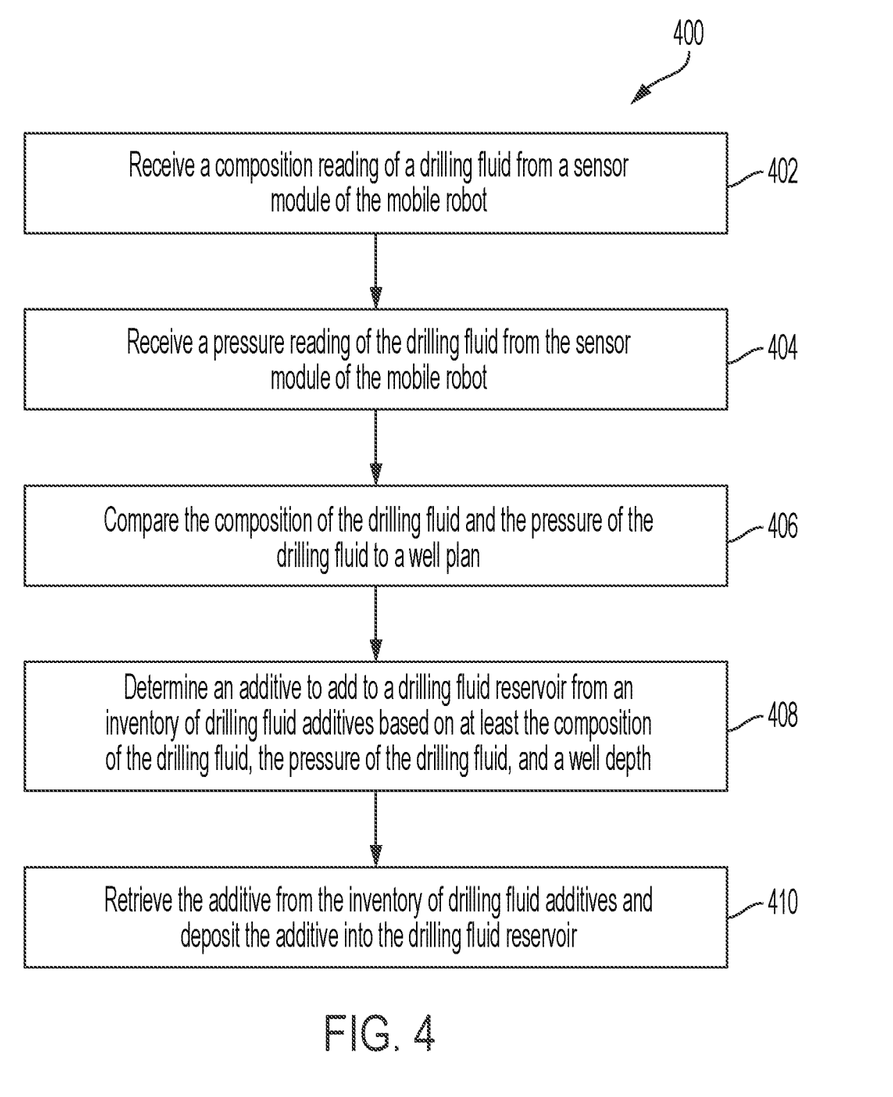
FIG. 4 is a flowchart of an example of a process for managing a drilling fluid with a mobile robot according to some aspects of the present disclosure.

FIG. 4 is a flowchart of an example process for managing a drilling fluid with a mobile robot 303 according to some aspects of the present disclosure. Some examples may include more steps, fewer steps, different steps, or a different combination of steps than is shown in FIG. 4. The steps of FIG. 4 are described below with reference to the components of FIG. 3 described above.

In block 402, the processor 302 may receive a composition reading 308 of a drilling fluid from a sensor module 332 of the mobile robot 303. Alternatively, the processor 302 may receive a composition reading 308 originating from a density and rheology unit, such as the server 113 of FIG. 1. The composition reading 308 may include an additive formulation, an oil-to-water ratio, a density, a lost circulation material content, a thermal capacity, a thermal conductivity, a salinity reading, or any other suitable reading related to the composition of a water based, non-aqueous based, or gaseous drilling fluid. The composition reading 308 may include multiple readings from sensor modules of multiple mobile robots or a combination of readings from the sensor module 332, another sensor module of at least one other mobile robot, or a sensor reading from an instrument external to the mobile robot 303. The composition reading 308 may be obtained from a sensor native to the sensor module 332 of mobile robot 303

In block 404, the processor 302 may receive a pressure reading 310 of the drilling fluid from the sensor module 332 of the mobile robot 303. The pressure reading 310 may be obtained from a pressure sensor native to the sensor module 332 mobile robot 303 or from an external instrument, such as a gauge, observed by a component of the sensor module 332, such as a camera.

In block 406, the processor 302 may compare the composition reading 308 and the pressure reading 310 to a well plan 326. The comparison may involve referencing graphs comparing an effective mud weight calculated using Baralogix® software, wherein the effective mud weight is calculated with a known mud weight and a cuttings concentration within an annulus of the wellbore, and Baralogix® software can calculate an effective mud weight at different well depths.

In block 408, the processor 302 may determine an additive to add to the drilling fluid reservoir from an inventory

107 based on at least the composition reading 308, the pressure reading 310, and a well depth. The inventory 107 can be a storage facility, such as a warehouse, containing chemicals and materials. Example additives can be alkalinity controllers, corrosion inhibitors, defoamers, emulsifiers, wetting agents, filtration reducers, lost circulation materials, lubricants, pipe-freeing agents, shale inhibitors, surfactants, temperature stabilizers, viscosity-modifying additives such as thinners and dispersants, viscosity-increasing additives, weighting agents, or wellbore strengthening materials. The processor 302 may select additives to avoid undesirable chemical combinations or undesirable chemical reactions.

In block 410, the processor 302 may instruct the mobile robot 303 to retrieve the additive from the inventory 107 and deposit the additive into the drilling fluid reservoir. This may involve the mobile robot 303 physically navigating to the inventory 107 containing the drilling fluid additives. Once at the inventory 107, the mobile robot 303 can physically lift (e.g., using an arm, pully, or other lifting mechanism) or otherwise obtain the target fluid additive. The mobile robot 303 can then navigate to the drilling fluid reservoir and pour the additive into the drilling fluid reservoir.

In some examples, the mobile robot 303 may request 314 that a secondary robot deliver the drilling fluid additive from the inventory 107. The mobile robot 303 may issue the request based on a sensor reading, for example indicating that there is less than a threshold amount of the additive in the drilling fluid. The mobile robot 303 may request that the secondary mobile robot perform this operation, rather than performing the operation itself, for any number of reasons. For example, the mobile robot 303 can detect (e.g., by interacting with the secondary robot) the secondary robot is both closer to the inventory 107 and is not currently engaged in a higher priority task. The secondary mobile robot can receive the request and responsively perform this operation.

In some examples, the mobile robot 303 may alter its travel path to remain a certain distance away from another mobile robot or location based on the content carried by the mobile robot 303. For example, a first mobile robot 303 may be carrying first content along a certain travel path to a destination. While traveling to the destination, the first mobile robot 303 can communicate with a second mobile robot and determine that the second mobile robot may be carrying second content. The second content may be hazardous when in a certain proximity to the first content carried by the first mobile robot 303. So, the mobile robot 303 can adjust its navigation path to remain a safe distance from the second mobile robot. As one particular example, in the course of retrieving or depositing the additive from the inventory 107, the mobile robot 303 may determine that a secondary mobile robot is carrying a certain chemical. The mobile robot 303 may alter its travel path based on the fact that it is carrying an additive that may be dangerous when near or mixed with the chemical. For example, the mobile robot 303 may be carrying sodium bicarbonate and the secondary mobile robot may be carrying a leaking lead-acid battery. So, the mobile robot 303 may alter its travel path avoid the secondary mobile robot, in an effort to avoid an undesired chemical reaction. The mobile robot 303 can determine that certain chemicals or other materials may be dangerous when mixed or in proximity to one another based on a predefined lookup table, which may indicate dangerous chemical combinations and compounds which may pose a danger when dropped. In some examples, the mobile robot 303 may also alter its travel path when a potential chemical combination or potential chemical behavior is unknown to the mobile robot 303 (e.g., out of an abundance of caution).

In some examples, the mobile robot 303 may determine that an amount of drilling fluid additive in the inventory 107 is below a threshold needed to implement by the well plan 326. In response to determining the amount of drilling fluid additive is below the threshold, the mobile robot 303 may transmit an order for more of the drilling fluid additive. For example, the mobile robot 303 may track the use of a particular weighting agent during the course of a drilling operation. As the operation progresses, the computational module 328 may determine the weighting agent is being consumed at a rate higher than the rate predicted by the well plan 326. The mobile robot 303 may determine the amount of weighing agent on hand at the wellsite will be insufficient given the newly discovered rate. In response, the mobile robot 303 may order more of the weighing agent to be delivered to the wellsite.

In some aspects, apparatus, methods, and systems for a mobile robot usable to manage drilling operations and other wellsite operations are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a mobile robot comprising: a frame; a propulsion module coupled to the frame and configured to move the mobile robot; a navigation module configured to operate the propulsion module to navigate the mobile robot along a target pathway from a starting location to a destination location; a computational module comprising at least one machine learning model a processing device; and a memory device including instructions executable by the processing device for causing the mobile robot to: receive a composition reading indicating a composition of a drilling fluid; receive a pressure reading indicating a pressure of the drilling fluid; determine, using the computational module, an additive to add to a drilling fluid reservoir from an inventory based on the composition of the drilling fluid, the pressure of the drilling fluid, and a well plan; and retrieve the additive from the inventory and deposit the additive into the drilling fluid reservoir.

Example 2 is the mobile robot of example 1, wherein the memory device further comprises instructions that are executable by the processing device to cause the mobile robot to: monitor a property related to the drilling fluid; request permission for an adjustment of the property related to the drilling fluid; and in response to receiving the permission, execute the adjustment of the property related to the drilling fluid.

Example 3 is the mobile robot of any of example(s) 1-2, wherein the memory device further comprises instructions that are executable by the processing device to cause the mobile robot to: detect an event; based on detecting the event, determine that a new task is to be prioritized over a current task; based on determining that the new task is to be prioritized over the current task, determine a stoppage plan for the current task based on an additive storage protocol, a wellsite traffic consideration, or a communication from another mobile robot; and implement the stoppage plan and execute the new task.

Example 4 is the mobile robot of example(s) 3, further comprising a sensor module, wherein the memory device further comprises instructions that are executable by the processing device to cause the mobile robot to: detect the event based on a reading from the sensor module.

Example 5 is the mobile robot of any of example(s) 1-4, wherein the machine learning model is trained with data from previous wellbore operations and a present wellbore operation.

Example 6 is the mobile robot of any of example(s) 1-5, wherein the memory device further comprises instructions that are executable by the processing device to cause the mobile robot to: request that a secondary robot deliver a drilling fluid additive from the inventory, wherein the request is generated by the mobile robot based on a sensor reading obtained by the mobile robot.

Example 7 is the mobile robot of any of example(s) 1-6, wherein the memory device further comprises instructions that are executable by the processing device to cause the mobile robot to receive a notification from a secondary mobile robot, the notification indicating first content of a first item carried by the secondary mobile robot; determine second content of a second item carried by the mobile robot; and alter a travel path of the mobile robot based on the first content and the second content.

Example 8 is the mobile robot of any of example(s) 1-7, wherein the memory device further comprises instructions that are executable by the processing device to cause the mobile robot to: determine that an amount of a drilling fluid additive in the inventory is below a threshold designed by the well plan; and in response to determining the amount of drilling fluid additive in the inventory is below the threshold, transmit an order for more of the drilling fluid additive.

Example 9 is the mobile robot of any of example(s) 1-8, wherein the memory device further comprises instructions that are executable by the processing device to cause the mobile robot to: conduct a rig survey to create a map of a wellsite, wherein the map is populated with elements related to the well plan.

Example 10 is the mobile robot of any of example(s) 1-9, wherein the memory device further comprises instructions that are executable by the processing device to cause the mobile robot to: generate an event notification based on observed equipment violating a predefined operating procedure.

Example 11 is a method comprising: receiving, by a mobile robot, a composition reading indicating a composition of a drilling fluid; receiving, by the mobile robot, a pressure reading indicating a pressure of the drilling fluid; determining, using a computational module, an additive to add to a drilling fluid reservoir from an inventory based on at least the composition of the drilling fluid, the pressure of the drilling fluid, and a well plan; and retrieving, by the mobile robot, the additive from the inventory and depositing the additive into the drilling fluid reservoir.

Example 12 is the method of example 11, further comprising: monitoring a property related to the drilling fluid, requesting, by the mobile robot, permission for an adjustment of the property related to the drilling fluid, and executing the adjustment of the property related to the drilling fluid.

Example 13 is the method of any of example(s) 11-12, further comprising: detecting, by the mobile robot, an event; based on detecting the event, determining, by the mobile robot, that a new task is to be prioritized over a current task; based on determining that the new task is to be prioritized over the current task, determining, by the mobile robot, a stoppage plan for the current task based on an additive storage protocol, a wellsite traffic consideration, and a communication from another mobile robot; and implementing, by the mobile robot, the stoppage plan and execution of the new task.

Example 14 is the method of any of example(s) 11-13, further comprising generating the event notification based on a reading from a sensor module of the mobile robot.

Example 15 is the method of any of example(s) 11-14, further comprising requesting at least one secondary robot deliver a drilling fluid additive from the inventory, and wherein the request is generated by the mobile robot based on a sensor reading obtained by the mobile robot.

Example 16 is the method of any of example(s) 11-15, further comprising: receiving a notification from a secondary mobile robot, the notification indicating first content of a first item carried by the secondary mobile robot; determining second content of a second item carried by the mobile robot; and altering a travel path of the mobile robot based on the first content and the second content.

Example 17 is the method of any of example(s) 11-16, determining that an amount of drilling fluid additive in the inventory is below a threshold designed by the well plan; and in response to determining the amount of drilling fluid additive in the inventory is below the threshold, transmitting an order for more of the drilling fluid additive.

Example 18 is the method of any of example(s) 11-17, further comprising conducting a rig survey to create a map of a wellsite, wherein the map is populated with elements related to the well plan.

Example 19 is the method of any of example(s) 11-18, further comprising further comprising generating an event notification based on observed equipment violating a predefined operating procedure.

Example 20 is a non-transitory computer-readable medium comprising instructions that are executable by a processing device of a mobile robot for causing the processing device to perform operations comprising: receiving a composition reading indicating a composition of a drilling fluid from a sensor module of a mobile robot; receiving a pressure reading indicating a pressure of the drilling fluid; determining, using a computational module, an additive to add to a drilling fluid reservoir from an inventory based on at least the composition of the drilling fluid, the pressure of the drilling fluid, and a well plan; and controlling the mobile robot to retrieve the additive from the inventory and deposit the additive into the drilling fluid reservoir.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A mobile robot comprising:
a frame;
a propulsion module coupled to the frame and configured to move the mobile robot;
a navigation module configured to operate the propulsion module to navigate the mobile robot along a target pathway from a starting location to a destination location;
a computational module comprising at least one machine learning model, wherein the at least one machine learning model is configured to be trained with data from previous wellbore operations and a present wellbore operation;
a processing device; and
a memory device including instructions executable by the processing device for causing the mobile robot to:

receive a composition reading indicating a composition of a drilling fluid;

receive a pressure reading indicating a pressure of the drilling fluid;

determine, using the computational module, an additive to add to a drilling fluid reservoir from an inventory based on the composition of the drilling fluid, the pressure of the drilling fluid, and a well plan; and retrieve the additive from the inventory and deposit the additive into the drilling fluid reservoir.

2. The mobile robot of claim 1, wherein the memory device further comprises instructions that are executable by the processing device to cause the mobile robot to:

monitor a property related to the drilling fluid;

request permission for an adjustment of the property related to the drilling fluid; and in response to receiving the permission, execute the adjustment of the property related to the drilling fluid.

3. The mobile robot of claim 1, wherein the memory device further comprises instructions that are executable by the processing device to cause the mobile robot to:

detect an event;

based on detecting the event, determine that a new task is to be prioritized over a current task;

based on determining that the new task is to be prioritized over the current task, determine a stoppage plan for the current task based on an additive storage protocol, a wellsite traffic consideration, or a communication from another mobile robot; and implement the stoppage plan and execute the new task.

4. The mobile robot of claim 3, further comprising a sensor module, wherein the memory device further comprises instructions that are executable by the processing device to cause the mobile robot to:

detect the event based on a reading from the sensor module.

5. The mobile robot of claim 1, wherein the memory device further comprises instructions that are executable by the processing device to cause the mobile robot to:

request that a secondary robot deliver a drilling fluid additive from the inventory, wherein the request is generated by the mobile robot based on a sensor reading obtained by the mobile robot.

6. The mobile robot of claim 1, wherein the memory device further comprises instructions that are executable by the processing device to cause the mobile robot to:

receive a notification from a secondary mobile robot, the notification indicating first content of a first item carried by the secondary mobile robot;

determine second content of a second item carried by the mobile robot; and alter a travel path of the mobile robot based on the first content and the second content.

7. The mobile robot of claim 1, wherein the memory device further comprises instructions that are executable by the processing device to cause the mobile robot to:

determine that an amount of a drilling fluid additive in the inventory is below a threshold designated by the well plan; and in response to determining the amount of drilling fluid additive in the inventory is below the threshold, transmit an order for more of the drilling fluid additive.

8. The mobile robot of claim 1, wherein the memory device further comprises instructions that are executable by the processing device to cause the mobile robot to:

conduct a rig survey to create a map of a wellsite, wherein the map is populated with elements related to the well plan.

9. The mobile robot of claim 1, wherein the memory device further comprises instructions that are executable by the processing device to cause the mobile robot to:

generate an event notification based on observed equipment violating a predefined operating procedure.

10. A method comprising:

conducting a rig survey to create a map of a wellsite, wherein the map is populated with elements related to a well plan;

receiving, by a mobile robot, a composition reading indicating a composition of a drilling fluid;

receiving, by the mobile robot, a pressure reading indicating a pressure of the drilling fluid;

determining, using a computational module, an additive to add to a drilling fluid reservoir from an inventory based on at least the composition of the drilling fluid, the pressure of the drilling fluid, and the well plan; and retrieving, by the mobile robot, the additive from the inventory and depositing the additive into the drilling fluid reservoir.

11. The method of claim 10, further comprising:

monitoring a property related to the drilling fluid;

requesting, by the mobile robot, permission for an adjustment of the property related to the drilling fluid; and executing the adjustment of the property related to the drilling fluid.

12. The method of claim 10, further comprising:

detecting, by the mobile robot, an event;

based on detecting the event, determining, by the mobile robot, that a new task is to be prioritized over a current task;

based on determining that the new task is to be prioritized over the current task, determining, by the mobile robot, a stoppage plan for the current task based on an additive storage protocol, a wellsite traffic consideration, and a communication from another mobile robot; and implementing, by the mobile robot, the stoppage plan and execution of the new task.

13. The method of claim 12, further comprising generating an event notification based on a reading from a sensor module of the mobile robot.

14. The method of claim 10, further comprising requesting at least one secondary robot deliver a drilling fluid additive from the inventory, and wherein the request is generated by the mobile robot based on a sensor reading obtained by the mobile robot.

15. The method of claim 10, further comprising:

receiving a notification from a secondary mobile robot, the notification indicating first content of a first item carried by the secondary mobile robot;

determining second content of a second item carried by the mobile robot; and altering a travel path of the mobile robot based on the first content and the second content.

16. The method of claim 10, further comprising:

determining that an amount of drilling fluid additive in the inventory is below a threshold designated by the well plan; and in response to determining the amount of drilling fluid additive in the inventory is below the threshold, transmitting an order for more of the drilling fluid additive.

17. The method of claim 10, further comprising generating an event notification based on observed equipment violating a predefined operating procedure.

18. A non-transitory computer-readable medium comprising instructions that are executable by a processing device of a mobile robot for causing the processing device to perform operations comprising:
- receiving a composition reading indicating a composition of a drilling fluid;
- receiving a pressure reading indicating a pressure of the drilling fluid;
- determining, using a computational module, an additive to add to a drilling fluid reservoir from an inventory based on at least the composition of the drilling fluid, the pressure of the drilling fluid, and a well plan;
- controlling the mobile robot to retrieve the additive from the inventory and deposit the additive into the drilling fluid reservoir monitoring a property related to the drilling fluid;
- requesting permission for an adjustment of the property related to the drilling fluid; and
- executing the adjustment of the property related to the drilling fluid.

19. A non-transitory computer-readable medium comprising instructions that are executable by a processing device of a mobile robot for causing the processing device to perform operations comprising:
- receiving a composition reading indicating a composition of a drilling fluid;
- receiving a pressure reading indicating a pressure of the drilling fluid;
- determining, using a computational module, an additive to add to a drilling fluid reservoir from an inventory based on at least the composition of the drilling fluid, the pressure of the drilling fluid, and a well plan;
- controlling the mobile robot to retrieve the additive from the inventory and deposit the additive into the drilling fluid reservoir;
- detecting an event;
- based on detecting the event, determining that a new task is to be prioritized over a current task;
- based on determining that the new task is to be prioritized over the current task, determining a stoppage plan for the current task; and
- implementing the stoppage plan and executing the new task.

20. A non-transitory computer-readable medium comprising instructions that are executable by a processing device of a mobile robot for causing the processing device to perform operations comprising:
- receiving a composition reading indicating a composition of a drilling fluid;
- receiving a pressure reading indicating a pressure of the drilling fluid;
- determining, using a computational module, an additive to add to a drilling fluid reservoir from an inventory based on at least the composition of the drilling fluid, the pressure of the drilling fluid, and a well plan;
- controlling the mobile robot to retrieve the additive from the inventory and deposit the additive into the drilling fluid reservoir; and
- generating an event notification based on observed equipment violating a predefined operating procedure.

* * * * *